(12) United States Patent
Zhang

(10) Patent No.: US 9,897,853 B2
(45) Date of Patent: Feb. 20, 2018

(54) BACKLIGHT MODULE AND DISPLAY DEVICE

(71) Applicant: Wuhan China Star Optoelectronics Technology Co., Ltd., Wuhan, Hubei (CN)

(72) Inventor: Yanxue Zhang, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 230 days.

(21) Appl. No.: 14/785,838

(22) PCT Filed: Jun. 10, 2015

(86) PCT No.: PCT/CN2015/081121
§ 371 (c)(1),
(2) Date: Oct. 20, 2015

(87) PCT Pub. No.: WO2016/187900
PCT Pub. Date: Dec. 1, 2016

(65) Prior Publication Data
US 2017/0108639 A1 Apr. 20, 2017

(30) Foreign Application Priority Data
May 25, 2015 (CN) .......................... 2015 1 0270063

(51) Int. Cl.
*G02F 1/1335* (2006.01)
*G02F 1/1333* (2006.01)
*F21V 8/00* (2006.01)

(52) U.S. Cl.
CPC ....... *G02F 1/133615* (2013.01); *G02B 6/009* (2013.01); *G02B 6/0088* (2013.01); *G02F 1/133308* (2013.01)

(58) Field of Classification Search
CPC .... G02B 6/0088; G02B 6/009; G02B 6/0011; G02B 6/0013; G02B 6/0015;
(Continued)

(56) References Cited

U.S. PATENT DOCUMENTS

| 5,211,464 A * | 5/1993 | Bohmer ................ F21V 19/009 362/634 |
| 2007/0030696 A1* | 2/2007 | Lv ........................ G02B 6/0091 362/615 |

(Continued)

FOREIGN PATENT DOCUMENTS

| CN | 102053404 A | 5/2011 |
| CN | 102691933 A | 9/2012 |

(Continued)

*Primary Examiner* — Edward Glick
*Assistant Examiner* — Shan Liu
(74) *Attorney, Agent, or Firm* — Andrew C. Cheng

(57) ABSTRACT

The present invention provides a backlight module, comprising a glue frame, a light guide plate and a backlight source, wherein the glue frame comprises two opposite side walls and end walls connecting with the two side walls, and a loading plate is located at an inner side of the end wall, and a limiting plate is connected between the two side walls, and the limiting plate and the loading plate are respectively located at two opposite sides of the light guide plate, and the light guide plate comprises an incident surface, a limiting block and a limiting slot, and the limiting block and the limiting slot are respectively located on two opposite surfaces of the light guide plate and close to one end of the light guide plate provided with the incident surface. The present invention further provides a display device.

14 Claims, 3 Drawing Sheets

(58) Field of Classification Search
CPC .... G02B 6/0016; G02B 6/0018; G02B 6/002;
G02B 6/0021; G02B 6/0023; G02B
6/0025; G02B 6/0026; G02B 6/0028;
G02B 6/003; G02B 6/0031; G02B
21/0032; G02B 21/06; G02B 21/16;
G02B 6/0033; G02B 6/0035; G02B
6/0038; G02B 6/004; G02B 6/0041;
G02B 6/0045; G02B 6/0046; G02B
6/0048; G02B 6/0051; G02B 6/0053;
G02B 6/0055; G02B 6/0056; G02B
6/0058; G02B 6/006; G02B 6/0061;
G02B 6/0063; G02B 6/0065; G02B
6/0066; G02B 6/0068; G02B 6/007;
G02B 6/0071; G02B 6/0073; G02B
6/0075; G02B 6/0076; G02B 6/0078;
G02B 6/008; G02B 6/10; G02B 6/102;
G02B 6/105; G02B 6/107; G02B 6/122;
G02B 6/1221; G02B 6/1223; G02B
6/1225; G02B 6/1226; G02B 2006/12083;
G02B 2006/12085; G02B 2006/12088;
G02B 2006/1209; G02B 2006/12092;
G02B 2006/12095; G02F 1/1336; G02F
2001/133607; G02F 2001/133616; G02F
1/133504; G02F 1/133615; G02F
1/133606; G02F 2001/133311; G02F
2001/133314; G02F 2001/133317; G02F
2001/13332; G02F 2001/133322; G02F
2001/133325; G02F 2001/133328; G02F
2001/13331; G02F 2001/133334; G02F
1/133308; G02F 1/133608; G01N 21/62;
G01N 21/6458; B82Y 20/00

USPC .......... 349/62–67, 58–60; 359/385; 385/129
See application file for complete search history.

(56) References Cited

U.S. PATENT DOCUMENTS

| | | | |
|---|---|---|---|
| 2008/0079863 A1* | 4/2008 | Jung | G02B 6/0086 349/58 |
| 2009/0103328 A1* | 4/2009 | Iwasaki | G02B 6/0041 362/617 |
| 2009/0229154 A1* | 9/2009 | Sadon | G09F 9/33 40/546 |
| 2013/0077347 A1* | 3/2013 | Hsu | G02F 1/13 362/613 |
| 2013/0135893 A1* | 5/2013 | Zhang | G09F 9/35 362/602 |
| 2013/0208509 A1* | 8/2013 | Cheng | G02F 1/133382 362/613 |
| 2013/0321741 A1* | 12/2013 | Yuan | G02B 6/0033 349/58 |
| 2015/0003107 A1* | 1/2015 | Kang | G02B 6/0011 362/611 |
| 2015/0009713 A1* | 1/2015 | Yang | G02B 6/0085 362/612 |

FOREIGN PATENT DOCUMENTS

| | | |
|---|---|---|
| CN | 103453387 A | 12/2013 |
| CN | 203442699 U | 2/2014 |
| KR | 10-2011-0056966 A | 5/2011 |

\* cited by examiner

BACKLIGHT MODULE AND DISPLAY DEVICE

CROSS REFERENCE

This application claims the priority of Chinese Patent Application No. 201510270063.3, entitled "Backlight module and display device", filed on May 25, 2015, the disclosure of which is incorporated herein by reference in its entirety.

FIELD OF THE INVENTION

The present invention relates to a liquid crystal display field, and more particularly to a backlight module and a display device.

BACKGROUND OF THE INVENTION

At present, a liquid crystal display device as being the display component of the electronic device has been widely applied in various kinds of electronic products. With the lightening development of the electronic products, the demand of the liquid crystal display device becomes higher and higher. The backlight module is an important component in the liquid crystal display device. The demand of quality and performance for the backlight module is higher and higher, too.

In prior arts, all the backlight modules comprise a glue frame, a light guide plate and an optical film. The glue frame is located at the periphery of the light guide plate. The optical film is fixed on the glue frame with light shielding tape. The light guide plate of the backlight module with such structure is loaded with one back plate. However, no direct fixing structure exists between light guide plate and the glue frame, and the fixing structure is required between the glue frame and the back plate. It does not only influence the assembly stability and efficiency of the backlight module but the assembly difficulty of the backlight module is also increased to affect the performance of the backlight module.

SUMMARY OF THE INVENTION

An objective of the present invention is to provide a backlight module for ensuring the position limitation between the glue frame and the light guide plate and promoting the stability of the backlight module assembly.

The present invention further provides a display device.

The present invention provides a backlight module, comprising a glue frame, a light guide plate and a backlight source, wherein the glue frame comprises two opposite side walls and end walls connecting with the two side walls, and a loading plate is located at an inner side of the end wall, and a limiting plate is connected between the two side walls, and the limiting plate and the loading plate are respectively located at two opposite sides of the light guide plate, and the light guide plate comprises an incident surface, a limiting block and a limiting slot, and the limiting block and the limiting slot are respectively located on two opposite surfaces of the light guide plate and close to one end of the light guide plate provided with the incident surface, and the glue frame is installed at periphery of the light guide plate, and the backlight source is installed on the loading plate and at one side of the incident surface, and the limiting slot is hold with the loading plate, and the limiting block is located between the end wall and the limiting plate, and is supported with the limiting plate for positioning the light guide plate on the glue frame.

The limiting plate and the loading plate are misaligned and oppositely located, and an end surface of the limiting plate toward the end wall is a first end surface, and an end surface of the loading plate toward the limiting plate is a second end surface, and the first end surface and the second end surface are oppositely located and positioned on the same plane.

A surface of the end wall of the glue frame between the two side walls is an inner surface, and the loading plate is located at one side of the inner surface; the limiting plate is located at one side of the two side walls away from the loading plate, and the limiting plate and the end wall has a gap in between, and a width of the gap and a width of the loading plate are the same.

The light guide plate further comprises an illuminating surface and a bottom surface opposite to the illuminating surface, and the incident surface connects the illuminating surface and the bottom surface, and the limiting block is located on the illuminating surface, and the limiting slot is located on the bottom surface and penetrates the bottom surface and the incident surface.

The backlight source comprises a light source circuit board and an illuminating element located on the light source circuit board, and the light source circuit board is located between the limiting block and the end wall, and the illuminating element and the incident surface are oppositely located.

The end wall, the backlight source, the limiting block, and the limiting plate are fixed and connected with double-side tapes.

A projection of the limiting plate on a plane where the loading plate is partially or completely overlaps with the loading plate.

The backlight module further comprises an optical film, and the optical film is installed on the illuminating surface of the light guide plate, and end parts of the optical film are clamped with the light guide plate and the limiting plate.

The present invention provides a display device, comprising the backlight module and a liquid crystal panel installed on the backlight module.

The backlight module further comprises an optical film, and the optical film is installed on the illuminating surface of the light guide plate, and end parts of the optical film are clamped with the light guide plate and the limiting plate, and the liquid crystal panel is located on the backlight module and opposite to the optical film.

The backlight module of the present invention arranges the loading plate and the limiting plate which are located in parallel, misaligned and oppositely located. Correspondingly, the limiting slot and the limiting block are located on the light guide plate. With the limitation of the limiting block and the limiting plate, and the holding of the limiting slot and the loading plate, the limiting cooperation between the glue frame and the light guide plate is achieved to effectively limit the movement of the backlight source and the optical film, and to reduce the assembly difficulty and failure rate of the backlight source and the light guide plate for promoting the assembly stability and efficiency of the backlight module.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other figures according to these figures without paying the premise.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are part of embodiments of the present invention, but not all embodiments. Based on the embodiments of the present invention, all other embodiments to those of ordinary skill in the premise of no creative efforts obtained, should be considered within the scope of protection of the present invention.

Figure 1:
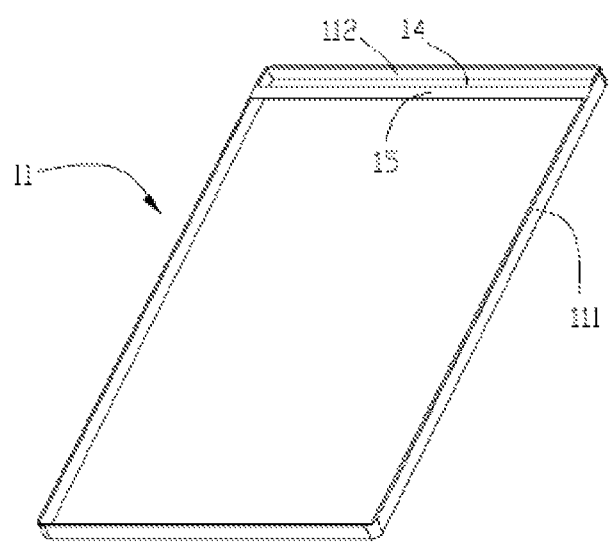
FIG. 1 is a structural diagram of a glue frame of a backlight module according to the preferred embodiment of the present invention.
Figure 2:
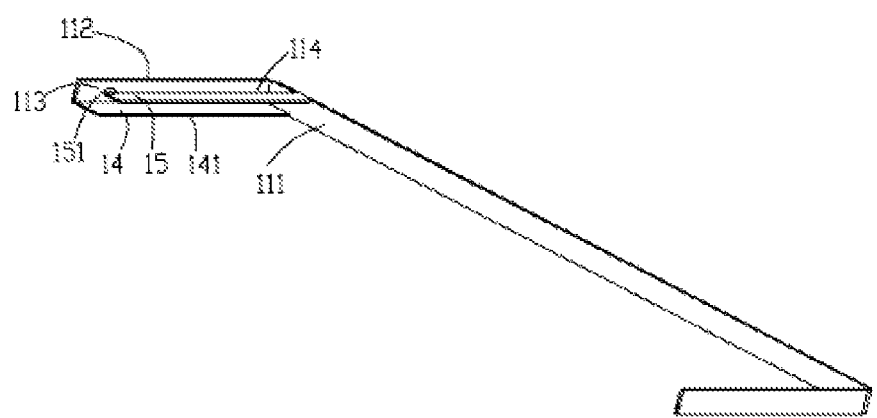
FIG. 2 is a three-dimension sectional diagram of the glue frame shown in FIG. 1.
Figure 3:
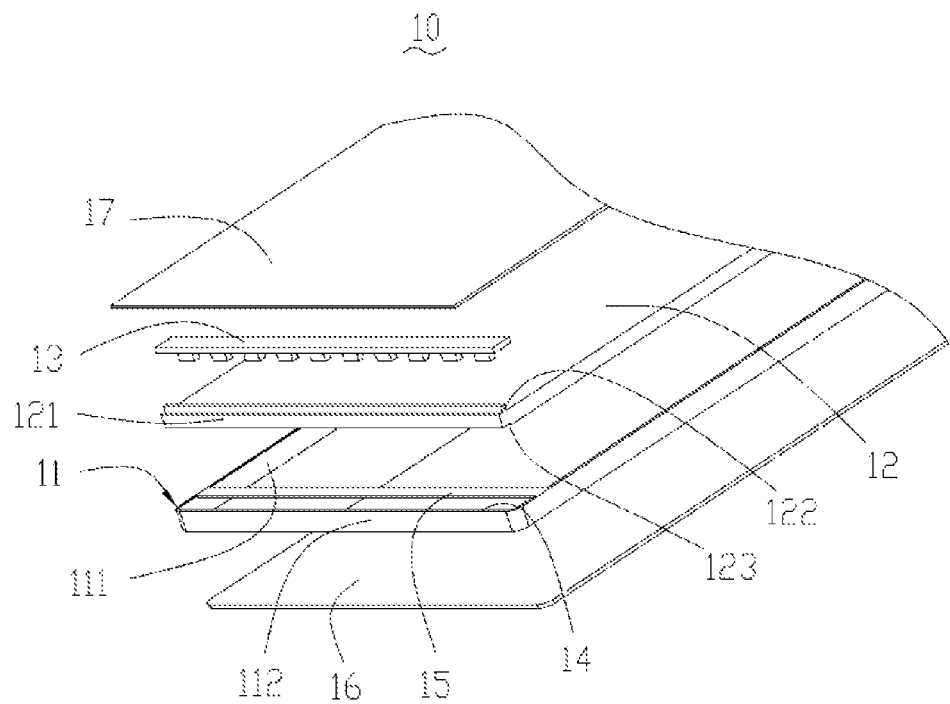
FIG. 3 is an exploded structure diagram of a backlight module according to the preferred embodiment of the present invention.
Figure 4:
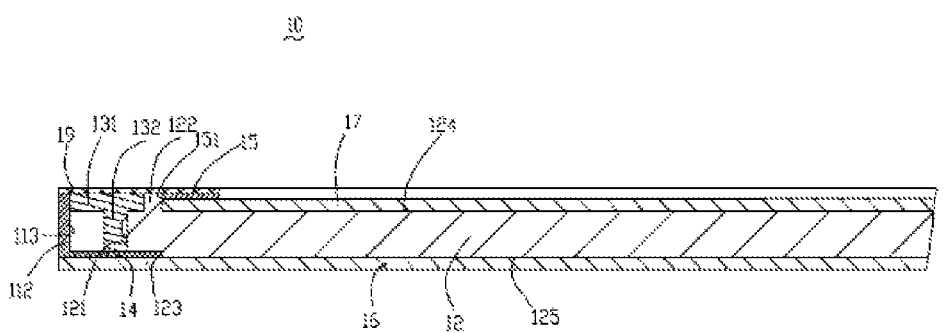
FIG. 4 is a sectional diagram of the backlight module shown in FIG. 3.
Figure 5:
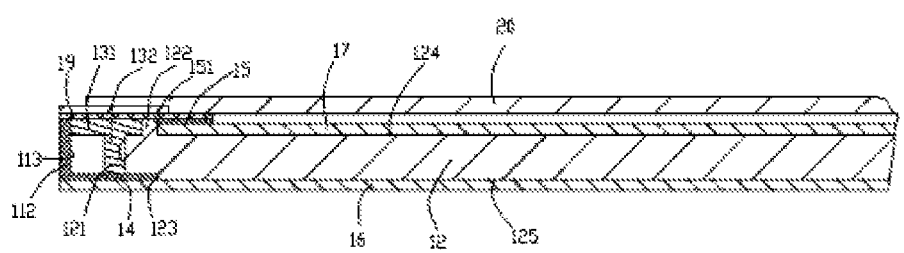
FIG. 5 is a sectional diagram of a display device according to the preferred embodiment of the present invention.

Please refer to FIG. 1, FIG. 2 and FIG. 3. The embodiment or the present invention provides a backlight module 10, comprising a glue frame 11, a light guide plate 12 and a backlight source 13. The glue frame 11 comprises two opposite side walls 111 and end walls 112 connecting with the two side walls 111. A loading plate 14 is located at one side the two end walls 112 between the end walls 112, and a limiting plate 15 is connected between the two side walls 111. The limiting plate 15 and the loading plate 14 are respectively located at two opposite sides of the light guide plate 12, and in this embodiment, the limiting plate 15 and the loading plate 14 are misaligned and oppositely located, and the limiting plate 15 is located at one side of the two side walls 111 away from the loading plate 14. With combination of FIG. 2 and FIG. 4, the loading plate 14 is located at the bottom of the glue frame 11, and the limiting plate 15 is located at the top of the glue frame 11, and the loading plate 14 and the limiting plate 15 tightly clamp the light guide plate 12 and the optical film 17 from the upper, lower two sides. The limiting plate 15 and the loading plate 14 are misaligned and oppositely located.

The light guide plate 12 comprises an incident surface 121, a limiting block 122 and a limiting slot 123. The limiting block 122 and the limiting slot 123 are respectively located on two opposite surfaces of the light guide plate 12 and close to one end of the light guide plate 12 provided with the incident surface 121. The glue frame 11 is installed at periphery of the light guide plate 12, and the backlight source 13 is installed on the loading plate 14 and between the glue frame 11 and the incident surface 121 of the light guide plate 12, and the limiting slot 123 is hold with the loading plate 14. The limiting block 122 is located between the end wall 112 and the limiting plate 15, and is supported with the limiting plate 15 for positioning the light guide plate 12 on the glue frame 11.

In this embodiment, a surface of the end wall 112 of the glue frame 11 between the two side walls 111 is an inner surface 113, and the loading plate 14 is located at one side of the inner surface 113; the limiting plate 15 is located at one side of the two side walls 111 away from the loading plate 14, and the limiting plate 15 and the end wall 112 has a gap 114 in between. Preferably, the glue frame 11 is a rectangular frame, and both the loading plate 14 and the limiting plate 15 are strip plate bodies. The loading plate 14 extends from one side of the inner surface 113 toward the inside of the glue frame 11. The limiting plate 15 is located between the two side walls 111 and forms the gap 114 with the inner surface 113 in between. Thus, the limiting plate 15 and the loading plate 14 are misaligned and oppositely located. Preferably, a width of the gap 114 and a width of the loading plate are the same for exactly expose the loading plate 14. In other words, a projection of the limiting plate 15 on a plane where the loading plate 14 is next to the loading plate 14, which is more beneficial for positioning and assembling the backlight module 13 and the light guide plate 12.

It is understandable that the projection of the limiting plate 15 in the present invention on a plane where the loading plate 14 can partially or completely overlap with or completely spaced with the loading plate 14. The next to condition of the misalignment in this embodiment is not limitation to the present invention. For example, referring to FIG. 4, the limiting slot 123 can continue to extend to the left, and the corresponding loading plate 14 does not stop extending to the left until it completely covers the limiting plate 15. In other words, it is realized that the projection of the limiting plate 15 on the plane where the loading plate 14 completely overlaps with the loading plate 14. This embodiment merely provides a preferred implementation but not a restriction to the present invention.

Similarly, it is understandable that the limiting plate 15 and the loading plate 14 are located in parallel but merely being a preferred implementation but not a restriction to the present invention. The specific positions and the appearances of the limiting plate 15 and the loading plate 14 can be adaptively changed according to the shapes and positions of the limiting block 122 and the limiting slot 123 on the light guide plate 12. They also can be obliquely arranged if necessary.

As regarding the aforementioned relative changes of the limiting plate 15, the loading plate 14, the limiting block 122 and the limiting slot 123 in this embodiment, as long as the limiting plate 15 and the loading plate 14 can limit the light guide plate 12 from the left, right two sides through the limiting block 122 and the limiting slot 123, and can tightly clamp the optical film 17 and the light guide plate 12 from the upper, lower two sides. The changes should be covered by the protected scope of the invention.

Furthermore, the light guide plate 12 further comprises an illuminating surface 124 and a bottom surface 125 opposite to the illuminating surface 124. The incident surface 121 connects the illuminating surface 124 and the bottom surface 125, and the limiting block 122 is located on the illuminating surface 124, and the limiting slot 123 is located on the bottom surface 125 and penetrates the bottom surface 125 and the incident surface 121. In this embodiment, the limiting block 122 is protruded close to one end of the illuminating surface 124 where the incident surface 121 is provided. The limiting block 122 and the limiting slot 123 are misaligned. As the limiting block 122 is supported with the limiting plate 15, the limiting slot 123 is hold with the loading plate 14. The end part of the loading plate 14 is inserted into the limiting slot 123 from the incident surface 121 to support and position the light guide plate 12. Meanwhile, the limiting block 122 is in the gap 114 and limited by the limiting plate 15 in advance for positioning more accurately and making the assembly of the light guide plate 12 better and faster.

Furthermore, the backlight module 10 further comprises a reflective sheet 16, and the reflective sheet 16 is installed under the bottom surface 125 of the light guide plate 12 and extends to the bottom of the loading plate 14 to assist the lamp source 13 and the light guide plate 12 fully utilizing the light and is employed to be the bottom surface of the backlight module 10.

Furthermore, the backlight module 10 further comprises an optical film 17, and the optical film 17 is installed on the illuminating surface 124 of the light guide plate 12. The two sides of the optical film 17 are clamped and fixed with the light guide plate 12 and the limiting plate 15 to effectively prevent the movement of the optical film 17 in the vertical direction, and as the end part of the optical film 17 is supported with the limiting block 122 to prevent the movement of the optical film 17 in the horizontal direction. Accordingly, the effective positioning of the optical film 17 is achieved to promote the stability of the backlight module assembly.

In this embodiment, an end surface of the limiting plate 15 toward the end wall 112 is a first end surface 151, and an end surface of the loading plate 14 toward the limiting plate 15 is a second end surface 141, and the first end surface 151 and the second end surface 141 are oppositely located and positioned in the same plane. Preferably, the limiting plate 15 and the loading plate 14 are staggered. The staggered distance is the width of the loading plate 14. As viewing the glue frame 11 from the top, the first end surface 151 and the second end surface 141 are exactly abutting jointed. As the limiting block 122 is hold with the limiting plate 15, and the limiting slot 123 is hold with the loading plate 14, the first end surface 151 and the second end surface 141 are in the same plane. The holding force of the limiting plate 15 to the limiting block 122 is opposite to the holding force of the limiting slot 123 to the loading plate 14 for exactly fixing the light guide plate 12. Meanwhile, the limiting plate 15 is supported with one end of the optical film 17. Accordingly, the optical film 17 and the light guide plate 12 are limited at the same time to prevent the optical film 17 and the light guide plate 12 vibrating in the glue frame 11.

Furthermore, the backlight source 13 comprises a light source circuit board 131 and an illuminating element 132 located on the light source circuit board, and the light source circuit board 131 is located between the limiting block 122 and the end wall 112, and the illuminating element 132 and the incident surface 121 are oppositely located. In this embodiment, the illuminating elements 132 are many and aligned at intervals on one surface of the light source circuit board 131. The light source circuit board 131 is installed between the limiting block 122 and the end wall 112 and clamped and fixed by the limiting block 122, the incident surface of the light guide plate and the end wall 112. Preferably, the end wall 112, the backlight source 13, the limiting block 122, and the limiting plate 15 are fixed and connected with double-side tapes 19.

The backlight module of the present invention arranges the loading plate 14 and the limiting plate 15 which are located in parallel, misaligned and oppositely located. Correspondingly, the limiting slot 123 and the limiting block 122 are located on the light guide plate. With the limitation of the limiting block 122 and the limiting plate 15, and the holding of the limiting slot 123 and the loading plate 14, the limitation between the glue frame 11 and the light guide plate 12 is achieved to effectively limit the movement of the backlight source 13 and the optical film 17, and to reduce the assembly difficulty and failure rate of the backlight source 13 and the light guide plate 12 for promoting the assembly stability and efficiency of the backlight module. The backlight design can be eliminated while promoting the assembly efficiency to reduce the difficulty of the backlight module assembly.

Please refer to FIG. 3. The present invention also relates to a display device, comprising the backlight module 10 and a liquid crystal panel 20 installed on the backlight module 10. The liquid crystal panel 20 is located on the backlight module 10 and opposite to the optical film 17.

Above are embodiments of the present invention, which does not limit the scope of the present invention. Any modifications, equivalent replacements or improvements within the spirit and principles of the embodiment described above should be covered by the protected scope of the invention.

What is claimed is:

1. A backlight module, comprising a glue frame, a light guide plate and a backlight source, wherein the glue frame comprises two opposite side walls and end walls connecting with the two opposite side walls, and a loading plate is located at an inner side of one of the end walls, and a limiting plate is connected between the two opposite side walls, and the limiting plate and the loading plate are respectively located at two opposite sides of the light guide plate, and the light guide plate comprises an incident surface, a limiting block and a limiting slot, and the limiting block and the limiting slot are respectively located on two opposite surfaces of the light guide plate and close to one end of the light guide plate provided with the incident surface, and the glue frame is installed at periphery of the light guide plate, and the backlight source is installed on the loading plate and between the glue frame and the light guide plate, and the limiting slot is hold with the loading plate, and the limiting block is located between the end wall and the limiting plate, and is supported with the limiting plate, and wherein the limiting plate and the loading plate are misaligned and oppositely located, and an end surface of the limiting plate toward the end wall is a first end surface, and an end surface of the loading plate toward the limiting plate is a second end surface, and the first end surface and the second end surface are oppositely located and positioned on the same plane.

2. The backlight module according to claim 1, wherein the light guide plate further comprises an illuminating surface and a bottom surface opposite to the illuminating surface, and the incident surface connects the illuminating surface and the bottom surface, and the limiting block is located on the illuminating surface, and the limiting slot is located on the bottom surface and penetrates the bottom surface and the incident surface.

3. The backlight module according to claim 1, wherein the backlight source comprises a light source circuit board and an illuminating element located on the light source circuit board, and the light source circuit board is located between the limiting block and the end wall, and the illuminating element and the incident surface are oppositely located.

4. The backlight module according to claim 1, wherein the end wall, the backlight source, the limiting block, and the limiting plate are fixed and connected with double-side tapes.

5. The backlight module according to claim 1, wherein a projection of the limiting plate on a plane where the loading plate is partially or completely overlaps with the loading plate.

6. The backlight module according to claim 1, wherein the backlight module further comprises an optical film, and the optical film is installed on the illuminating surface of the light guide plate, and two sides of the optical film are respectively clamped and fixed with the light guide plate and the limiting plate, and an end part of the optical film is supported with the limiting block.

7. A display device, comprising a backlight module and a liquid crystal panel installed on the backlight module, and the backlight module comprises a glue frame, a light guide plate and a backlight source, wherein the glue frame comprises two opposite side walls and end walls connecting with the two opposite side walls, and a loading plate is located at an inner side of one of the end walls, and a limiting plate is connected between the two opposite side walls, and the limiting plate and the loading plate are respectively located at two opposite sides of the light guide plate, and the light guide plate comprises an incident surface, a limiting block and a limiting slot, and the limiting block and the limiting slot are respectively located on two opposite surfaces of the light guide plate and close to one end of the light guide plate provided with the incident surface, and the glue frame is installed at periphery of the light guide plate, and the backlight source is installed on the loading plate and between the glue frame and the light guide plate, and the limiting slot is hold with the loading plate, and the limiting block is located between the end wall and the limiting plate, and is supported with the limiting plate; and wherein the limiting plate and the loading plate are misaligned and oppositely located, and an end surface of the limiting plate toward the end wall is a first end surface, and an end surface of the loading plate toward the limiting plate is a second end surface, and the first end surface and the second end surface are oppositely located and positioned on the same plane.

8. The display device according to claim 7, wherein a surface of the end wall of the glue frame between the two opposite side walls is an inner surface, and the loading plate is located at one side of the inner surface; the limiting plate is located at one side of the two opposite side walls away from the loading plate, and the limiting plate and the end wall has a gap in between, and a width of the gap and a width of the loading plate are the same.

9. The display device according to claim 7, wherein the light guide plate further comprises an illuminating surface and a bottom surface opposite to the illuminating surface, and the incident surface connects the illuminating surface and the bottom surface, and the limiting block is located on the illuminating surface, and the limiting slot is located on the bottom surface and penetrates the bottom surface and the incident surface.

10. The display device according to claim 7, wherein the backlight source comprises a light source circuit board and an illuminating element located on the light source circuit board, and the light source circuit board is located between the limiting block and the end wall, and the illuminating element and the incident surface are oppositely located.

11. The display device according to claim 7, wherein the end wall, the backlight source, the limiting block, and the limiting plate are fixed and connected with double-side tapes.

12. The display device according to claim 7, wherein a projection of the limiting plate on a plane where the loading plate is partially or completely overlaps with the loading plate.

13. The display device according to claim 7, wherein the backlight module further comprises an optical film, and the optical film is installed on the illuminating surface of the light guide plate, and two opposite sides of the optical film are respectively clamped and fixed with the light guide plate and the limiting plate, and an end part of the optical film is supported with the limiting block, and the liquid crystal panel is located on a side of the backlight module opposite to the optical film.

14. A backlight module, comprising a glue frame, a light guide plate and a backlight source, wherein the glue frame comprises two opposite side walls and end walls connecting with the two opposite side walls, and a loading plate is located at an inner side of one of the end walls, and a limiting plate is connected between the two opposite side walls, and the limiting plate and the loading plate are respectively located at two opposite sides of the light guide plate, and the light guide plate comprises an incident surface, a limiting block and a limiting slot, and the limiting block and the limiting slot are respectively located on two opposite surfaces of the light guide plate and close to one end of the light guide plate provided with the incident surface, and the glue frame is installed at periphery of the light guide plate, and the backlight source is installed on the loading plate and between the glue frame and the light guide plate, and the limiting slot is hold with the loading plate, and the limiting block is located between the end wall and the limiting plate, and is supported with the limiting plate; and wherein a surface of the end wall of the glue frame between the two opposite side walls is an inner surface, and the loading plate is located at one side of the inner surface; the limiting plate is located at one side of the two opposite side walls away from the loading plate, and the limiting plate and the end wall has a gap in between, and a width of the gap and a width of the loading plate are the same.

* * * * *